(12) United States Patent
Wang et al.

(10) Patent No.: US 10,011,245 B2
(45) Date of Patent: Jul. 3, 2018

(54) ADJUSTMENT DEVICE FOR SEAT BELT MECHANISM

(71) Applicant: Liang-Hsiung Wang, Tainan (TW)

(72) Inventors: Liang-Hsiung Wang, Tainan (TW); Chia-Chun Chu, Tainan (TW)

(73) Assignee: Liang-Hsiung Wang, Tainan (TW)

( * ) Notice: Subject to any disclaimer, the term of this patent is extended or adjusted under 35 U.S.C. 154(b) by 8 days.

(21) Appl. No.: 15/451,576

(22) Filed: Mar. 7, 2017

(65) Prior Publication Data

US 2017/0267209 A1   Sep. 21, 2017

(30) Foreign Application Priority Data

Mar. 16, 2016   (TW) .............................. 105203609 U

(51) Int. Cl.
 *B60R 22/10* (2006.01)
 *B60R 22/20* (2006.01)
 *B60R 22/30* (2006.01)

(52) U.S. Cl.
 CPC .............. *B60R 22/30* (2013.01); *B60R 22/10* (2013.01); *B60R 22/20* (2013.01)

(58) Field of Classification Search
 CPC ....... B60R 22/024; B60R 22/10; B60R 22/20; B60R 22/30
 See application file for complete search history.

(56) References Cited

U.S. PATENT DOCUMENTS

| | | | | |
|---|---|---|---|---|
| 3,860,261 A | * | 1/1975 | Takada | B60R 22/023 280/807 |
| 4,796,919 A | * | 1/1989 | Linden | B60R 22/024 280/808 |
| 4,799,737 A | * | 1/1989 | Greene | B60R 22/024 280/808 |
| 4,893,835 A | * | 1/1990 | Linden | B60R 22/024 280/808 |
| 6,868,585 B2 | * | 3/2005 | Anthony | A44B 11/14 24/134 R |
| 7,506,413 B2 | * | 3/2009 | Dingman | B60R 22/20 24/170 |
| 7,571,934 B2 | * | 8/2009 | Bell | B60R 22/20 280/801.1 |
| 2003/0019080 A1 | * | 1/2003 | Anthony | A44B 11/14 24/68 R |

(Continued)

*Primary Examiner* — Barry Gooden, Jr.
(74) *Attorney, Agent, or Firm* — Rosenberg, Klein & Lee

(57) ABSTRACT

An adjustment device has a frame, a guide, a holding bar, a connector, and a manipulating unit. The frame has a holding inclined surface. The guide has two guiding slots extending longitudinally. The holding bar is disposed in and is movable along the guiding slots. The holding bar and the holding inclined surface clamp the webbing of the seat belt. The connector is mounted around the frame and is connected to the webbing. The manipulating unit is slidably mounted around the connector and has a pushing portion formed on a back side of the front slat and disposed under the holding bar and in front of the holding inclined surface. The adjustment device is to connect the webbing's second segment that is positioned vertically and clamp the webbing's first segment that is fastened obliquely on a user, and is simply operated by stepless adjustment to enhance comfort and safety.

19 Claims, 10 Drawing Sheets

(56) References Cited

U.S. PATENT DOCUMENTS

| | | | |
|---|---|---|---|
| 2006/0075609 A1* | 4/2006 | Dingman | B60R 22/20 24/68 CD |
| 2008/0100051 A1* | 5/2008 | Bell | B60R 22/024 280/801.1 |
| 2008/0122214 A1* | 5/2008 | Bell | B60R 22/024 280/801.1 |
| 2009/0091115 A1* | 4/2009 | Bell | B60R 22/20 280/801.2 |
| 2016/0082921 A1* | 3/2016 | Sun | B60R 22/34 242/383 |

* cited by examiner

ADJUSTMENT DEVICE FOR SEAT BELT MECHANISM

CROSS-REFERENCE TO RELATED APPLICATIONS

This application is based upon and claims priority under 35 U.S.C. 119 from Taiwan Patent Application No. 105203609 filed on Mar. 16, 2016, which is hereby specifically incorporated herein by this reference thereto.

BACKGROUND

1. Technical Field

The present invention relates to an adjustment device, and more particularly to an adjustment device applied to a seat belt mechanism of a motor vehicle.

2. Description of the Prior Art(s)

A seat belt mechanism is designed for the safety of the driver or the passenger seated on the seat of the motor vehicle. Generally, the seat belt mechanism has a retractor, a webbing, a guiding ring, a tongue mounted on the webbing, and a buckle. The retractor is mounted inside the motor vehicle. The guiding ring is mounted in the motor vehicle at a position above the retractor. When a user is seated on the seat, the webbing is pulled out from the retractor, passes through the guiding ring, and passes by the front side of the user's torso from top to bottom obliquely. And then the tongue is connected with the buckle, so as to restrain the user on the seat.

For the safety and the comfort of the user, the height of the guiding ring for small-sized cars is designed to be adjustable. In this way, the height of the guiding ring may be adjusted according to the height of the user, so as to prevent the webbing from abutting against the neck of the user and to improve the comfort. However, the adjustment range of the guiding ring is short and the height adjustment is done in multiple steps. As such, the guiding ring barely meets the needs of different users in terms of comfort.

In addition, the height of the guiding ring for large-sized cars, such as a truck or a sport utility vehicle (SUV), may not be adjusted. The webbing may be at an improper position when in use. Therefore, the driver or the passenger seated in the large-sized cars is unsafe and uncomfortable when using the seat belt.

To overcome the shortcomings, an adjustment device for a seat belt mechanism to mitigate or obviate the aforementioned problems is provided.

SUMMARY

An objective of the present invention is to provide an adjustment device for a seat belt mechanism to overcome the technical limitation in the insufficient comfort provided by the guiding ring for the users using the seat belt mechanism.

In accordance with an embodiment, the adjustment device comprises a frame, a guide, a holding bar, a connector, and a manipulating unit. The frame comprises a base, two straight edges, and a holding inclined surface. The straight edges are respectively disposed at a left side of the base and a right side of the base. The holding inclined surface is formed on a front side of the base, disposed between the straight edges, and inclined forwardly from top to bottom. The guide comprises two guiding bars and two guiding slots. The guiding bars are respectively fixed at a left side of the frame and a right side of the frame, and are disposed in front of the straight edges at an interval. Each of the guiding slots is surrounded by a corresponding one of the guiding bars and a corresponding one of the straight edges, and extends longitudinally. The holding bar is transversely disposed on the holding inclined surface. The holding bar comprises two opposite ends respectively extending into the guiding slots, so as to be movable along the guiding slots. The connector is mounted around the frame. The connector comprises two side walls arranged at an interval, a back wall connected between the side walls, a cross arm connected between the side walls and disposed above the holding bar, and a through slot extending longitudinally. The through slot is surrounded by the back wall and a back side of the frame. The manipulating unit is slidably mounted around the connector. The manipulating unit comprises a front slat, two side slats, a pushing portion, and two limits. The front slat is positioned in front of the frame and the guide. The side slats respectively extend backwardly from a left side of the front slat and a right side of the front slat. The side slats are adjacent to the side walls respectively. The pushing portion is formed on a back side of the front slat. The pushing portion is disposed under the holding bar and in front of the holding inclined surface. The limit portions are disposed on the top sides of the side slats respectively and above a top of the connector.

The adjustment device may be mounted through by a first segment of a webbing of a seat belt mechanism and mounted on a second segment of the same webbing, wherein the first segment passes by the front side of the user's torso from top to bottom obliquely, and the second segment is positioned between a retractor and a guiding ring of the seat belt mechanism vertically. The holding bar and the holding inclined surface may clamp the first segment to lock the adjustment device on the webbing. The adjustment device may be unlocked by the manipulating unit to move upwardly or downwardly along the webbing for a stepless height adjustment. After the external force exerted on the manipulating unit is removed, the holding bar may be pushed toward the holding inclined surface by the tension of the webbing, and thus the adjustment device automatically locks on the webbing. As such, the position of the webbing may be adjusted easily, thereby enhancing the safety and the comfort of a user using the seat belt mechanism.

Further, the height of the adjustment device on the webbing is adjusted as follows.

In one aspect, the user only needs to apply a downward pressure relative to the webbing on the connector by the manipulating unit to force the frame to move downwardly relative to the webbing, and thus the holding bar is moved away from the holding inclined surface by the friction between the holding bar and the first segment to disable the adjustment device's locking facility to the first segment. And then the height of the adjustment device on the webbing may be decreased.

In another aspect, the user only needs to move the manipulating unit upwardly relative to the webbing by hand, and thus the holding bar is pushed upwardly by the manipulating unit and is moved away from the holding inclined surface to disable the adjustment device's locking facility to the first segment. Then the height of the adjustment device on the webbing may be increased.

Once the height of the adjustment device on the webbing is adjusted to the desired position, the holding bar may be pushed toward the holding inclined surface by the tension of the webbing, and the adjustment device may be automatically locked on the webbing again. Accordingly, the operation of the adjustment device is simple.

Therefore, the adjustment device not only has the advantage of enhancing the comfort and the safety of using the seat belt mechanism, but also has the advantage of simple operation.

Other objectives, advantages, and novel features of the embodiments of the present invention will become more apparent from the following detailed description when taken in conjunction with the accompanying drawings.

DETAILED DESCRIPTION

Figure 1:
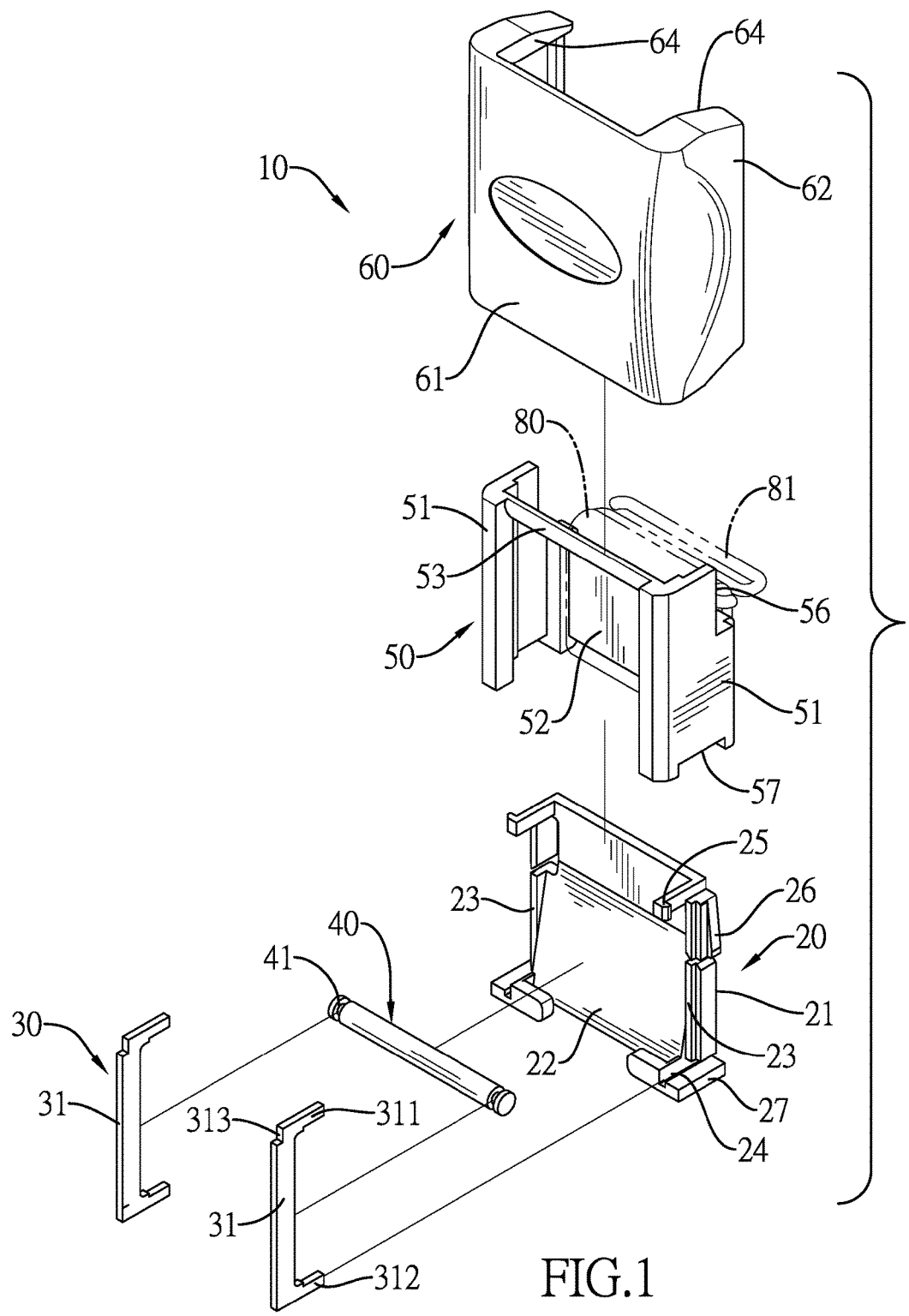
FIG. 1 is a front exploded perspective view of an embodiment of an adjustment device for a seat belt mechanism in accordance with the present invention.

With reference to FIG. 1, an embodiment of an adjustment device 10 for a seat belt mechanism comprises a frame 20, a guide 30, a holding bar 40, a connector 50, and a manipulating unit 60.

Figure 2:
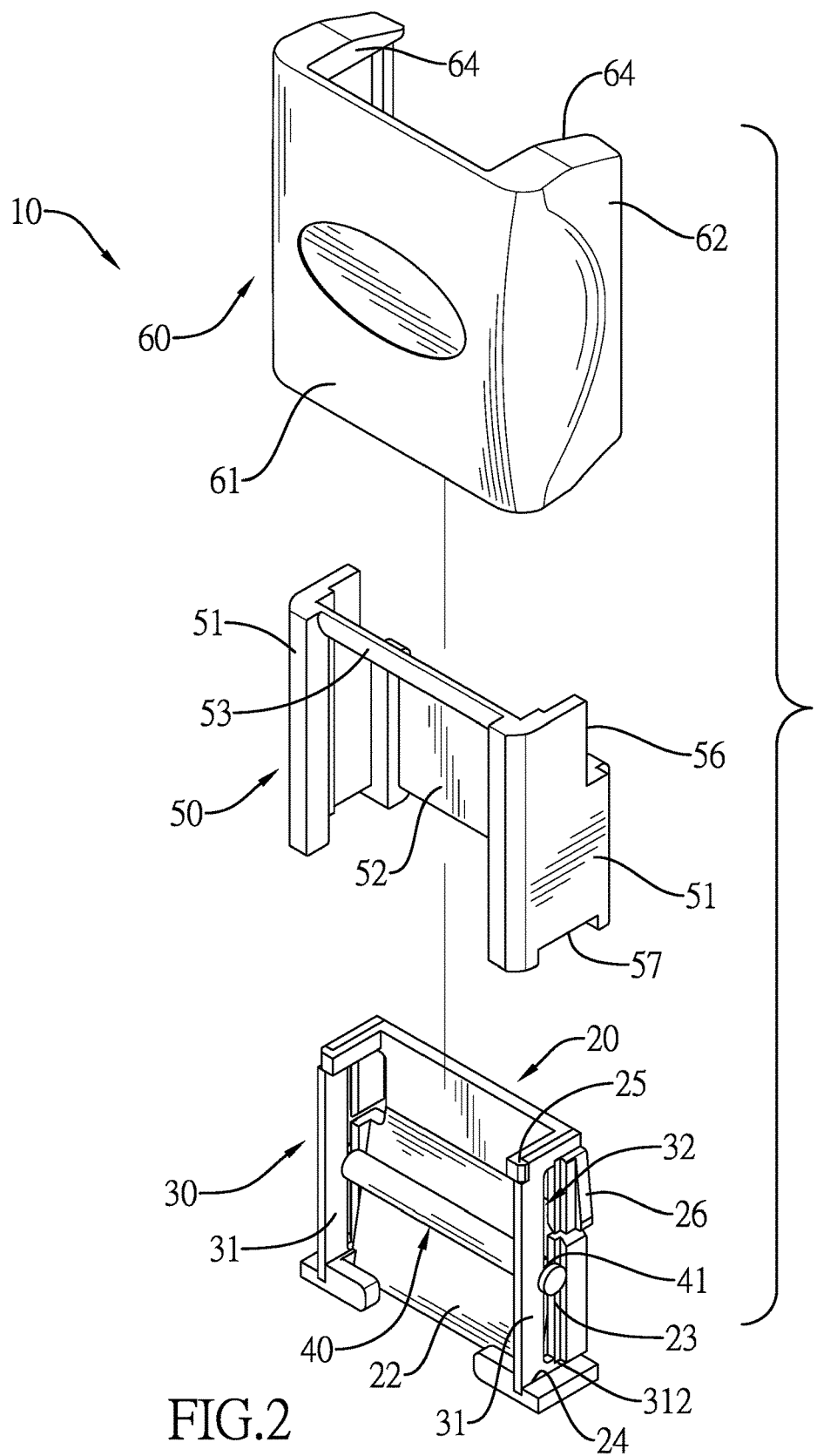
FIG. 2 is a front exploded perspective view of the adjustment device in FIG. 1, showing the base, the guide, and the holding bar are assembled.

With reference to FIGS. 1 and 2, the frame 20 comprises a base 21, a holding inclined surface 22 formed on a front side of the base 21, two straight edges 23, two insertion slots 24, two hooks 25, two resilient blocks 26, and two engaging protrusions 27. The straight edges 23 are disposed at a left side of the base 21 and a right side of the base 21 respectively. The holding inclined surface 22 is disposed between the straight edges 23. The holding inclined surface 22 is inclined forwardly from top to bottom. The insertion slots 24 are disposed at the left side of the base 21 and the right side of the base 21 respectively, and are adjacent to a bottom side of the base 21. The hooks 25 are disposed at the left side of the base 21 and the right side of the base 21 respectively, and are adjacent to a top side of the base 21. The resilient blocks 26 are disposed at a top of the left side of the base 21 and a top of the right side of the base 21 respectively. The engaging protrusions 27 protrude outwardly from a bottom of the left side of the base 21 and a bottom of the right side of the base 21 respectively. The engaging protrusions 27 are arranged respectively under the resilient blocks 26.

Figure 3:
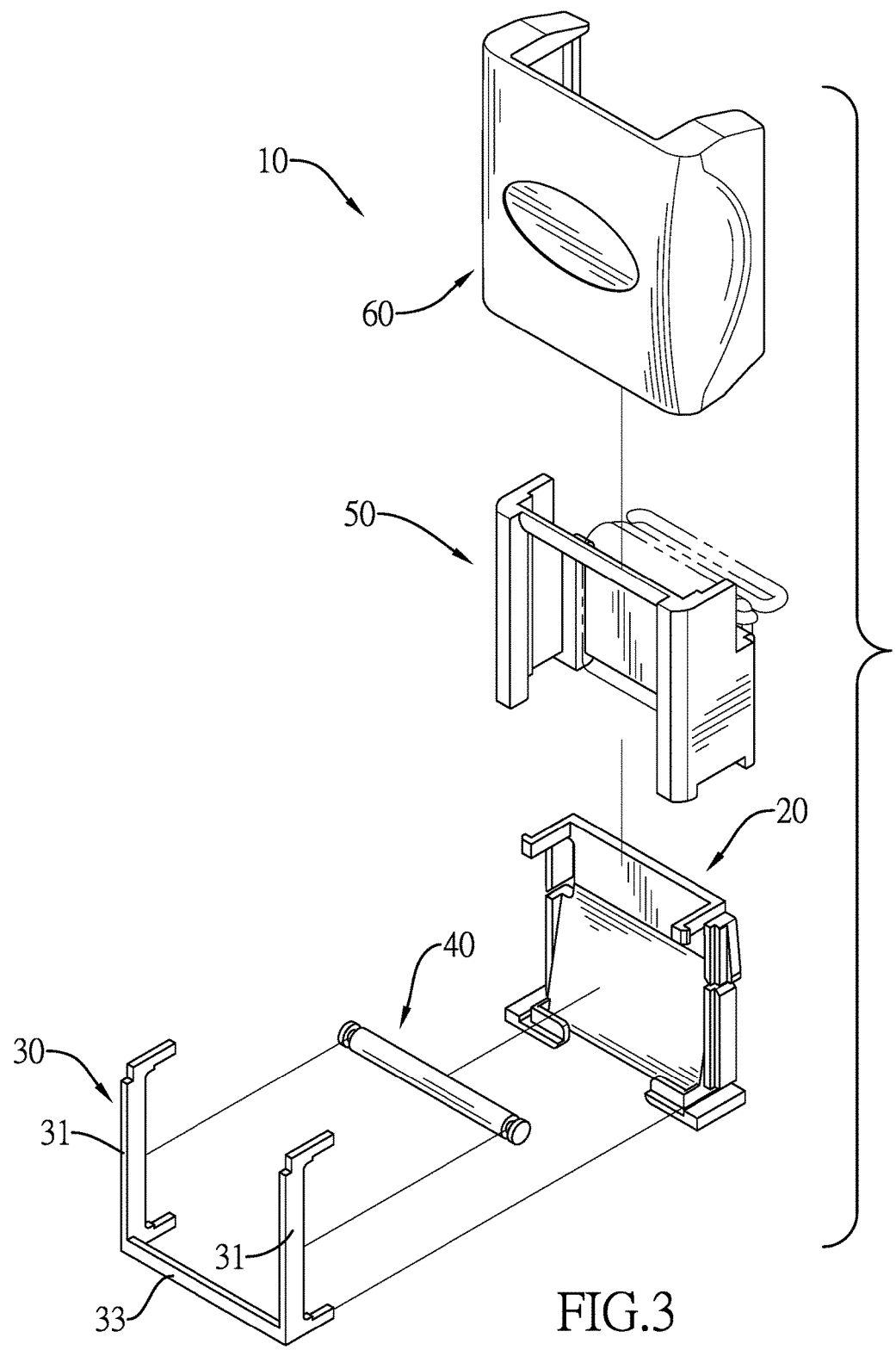
FIG. 3 is a front exploded perspective view of another embodiment of an adjustment device for a seat belt mechanism in accordance with the present invention.

With reference to FIGS. 1 and 2, the guide 30 comprises two guiding bars 31. The guiding bars 31 are fixed at a left side of the frame 20 and a right side of the frame 20 respectively. The guiding bars 31 are disposed in front of the straight edges 23 at an interval. Each of the guiding slots 32 is formed between a corresponding one of the guiding bars 31 and a corresponding one of the straight edges 23. The guiding slots 32 extend longitudinally. In an embodiment, as shown in FIG. 1, the guiding bars 31 are two independent elements. In another embodiment, as shown in FIG. 3, the guide 30 further comprises a cross bar 33 connected between the guiding bars 31. The guide 30 is integrated as one single part.

With reference to FIGS. 1 and 2, each of the guiding bars 31 comprises a top end, a bottom end, an upper protrusion 311 extending backwardly from the top end, a lower protrusion 312 extending backwardly from the bottom end, and an engaging notch 313 disposed on the top end. The upper protrusion 311 abuts the top side of the base 21, the lower protrusion 312 is inserted into a corresponding one of the insertion slots 24, and the engaging notch 313 is engaged with a corresponding one of the hooks 25, so as to fix the guide 30 on the base 21.

With reference to FIGS. 1 and 2, the holding bar 40 is transversely disposed at the front side of the base 21 and on the holding inclined surface 22. The holding bar 40 comprises two opposite ends extending into the guiding slots 32 respectively, so that the holding bar 40 may move up and down along the guiding slots 32. In an embodiment, as shown in FIGS. 1 and 3, the holding bar 40 comprises two annular recesses 41 formed on the two opposite ends respectively. Each of the annular recesses 41 is connected with a corresponding one of the guiding bars 31 and a corresponding one of the straight edges 23.

With reference to FIGS. 1, 2, 4, and 5, the connector 50 is mounted around the frame 20. The connector 50 comprises two side walls 51, a back wall 52, a cross arm 53, a through slot 54, two guiding grooves 55, two top engaging recesses 56, and two bottom engaging recesses 57. The side walls 51 are arranged at an interval. The back wall 52 is connected between rear portions of the side walls 51. The cross arm 53 is connected between tops of the side walls 51 and is disposed above the holding bar 40. The through slot 54 extends longitudinally and is surrounded by the back wall 52 and a back side of the frame 20. The guiding grooves 55 are disposed on the rear portions of the side walls 51 respectively and extend longitudinally. The top engaging recesses 56 are disposed on the tops of the side walls 51 respectively. Each of the top engaging recesses 56 is connected to a corresponding one of the guiding grooves 55. The bottom engaging recesses 57 are disposed on bottoms of the side walls 51 respectively. The connector 50 is fixed with the frame 20 by engaging the top engaging recesses 56 with the resilient blocks 26 respectively, and engaging the bottom engaging recesses 57 with the engaging protrusions 27 respectively.

Figure 4:
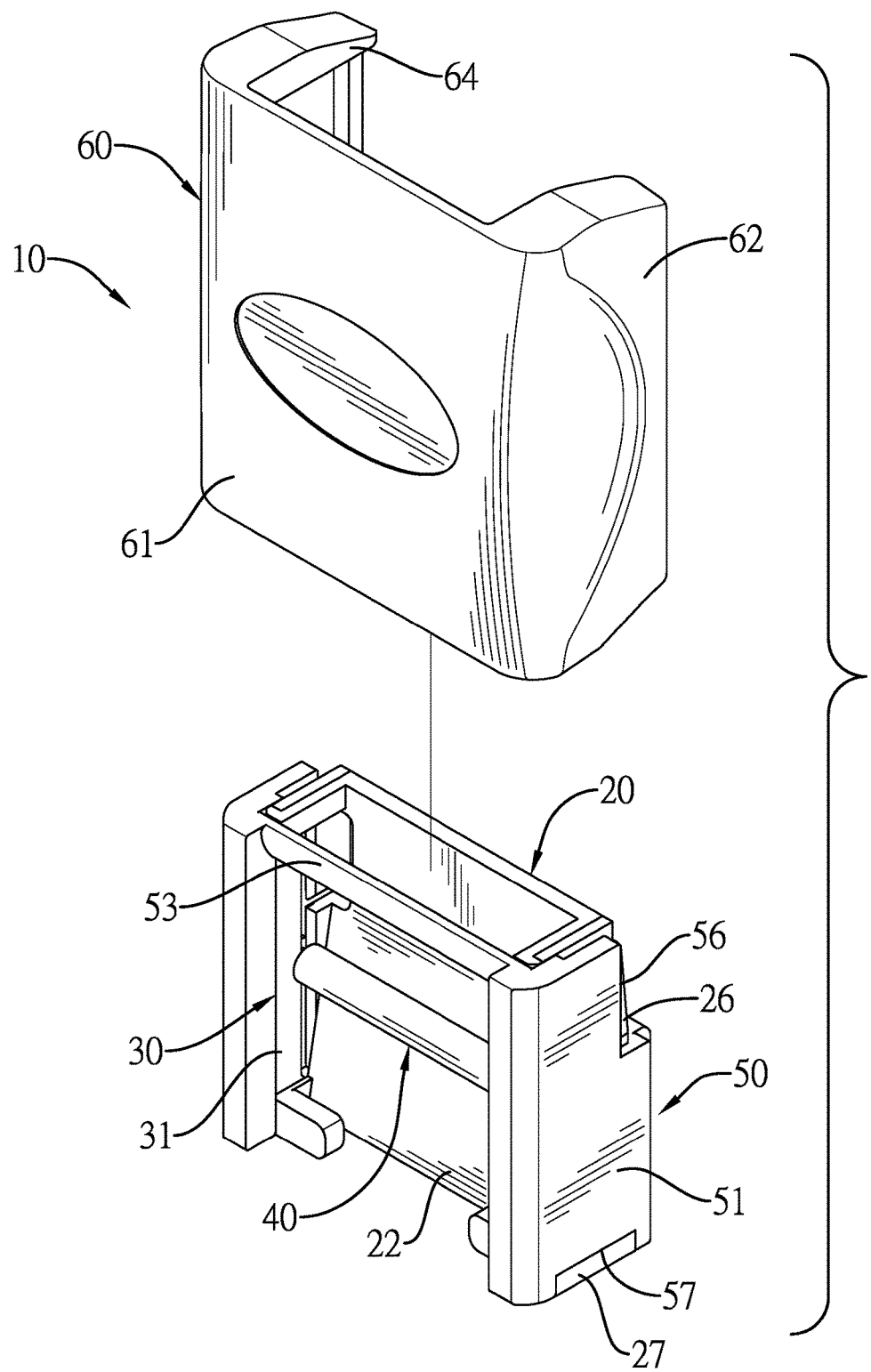
FIG. 4 is a front exploded perspective view of the adjustment device in FIG. 1, showing the base, the guide, the holding bar, and the connector are assembled.
Figure 5:
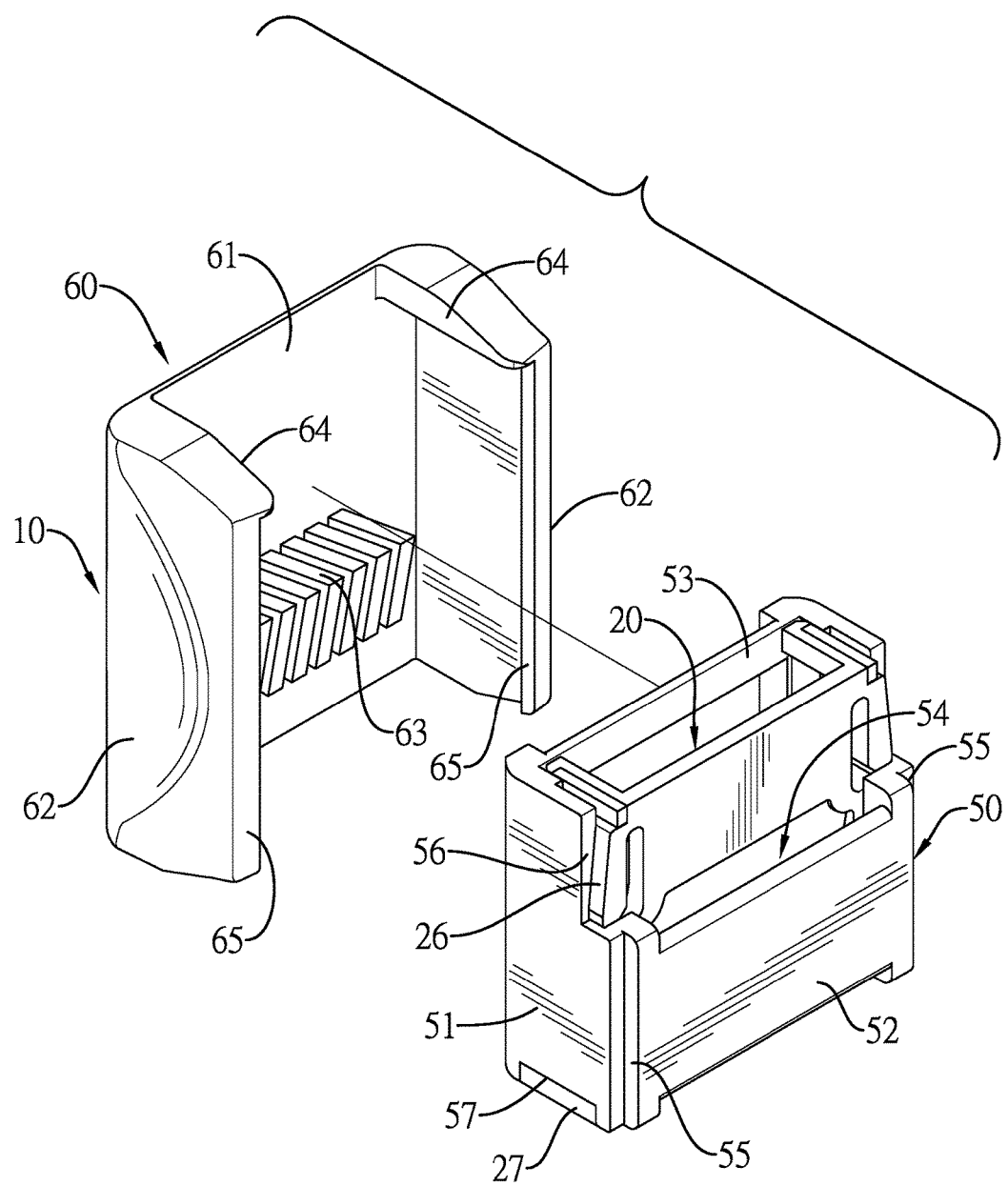
FIG. 5 is a back exploded perspective view of the adjustment device in FIG. 4.
Figure 6:
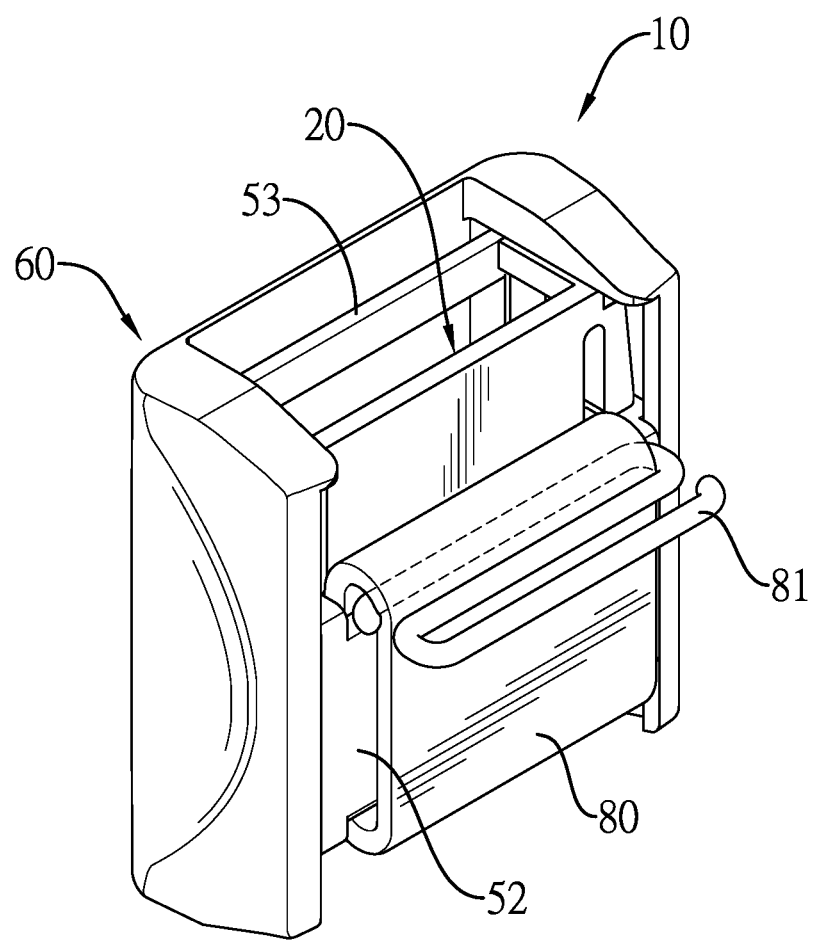
FIG. 6 is a back perspective view of the adjustment device in FIG. 1, shown fully assembled.
Figure 7:
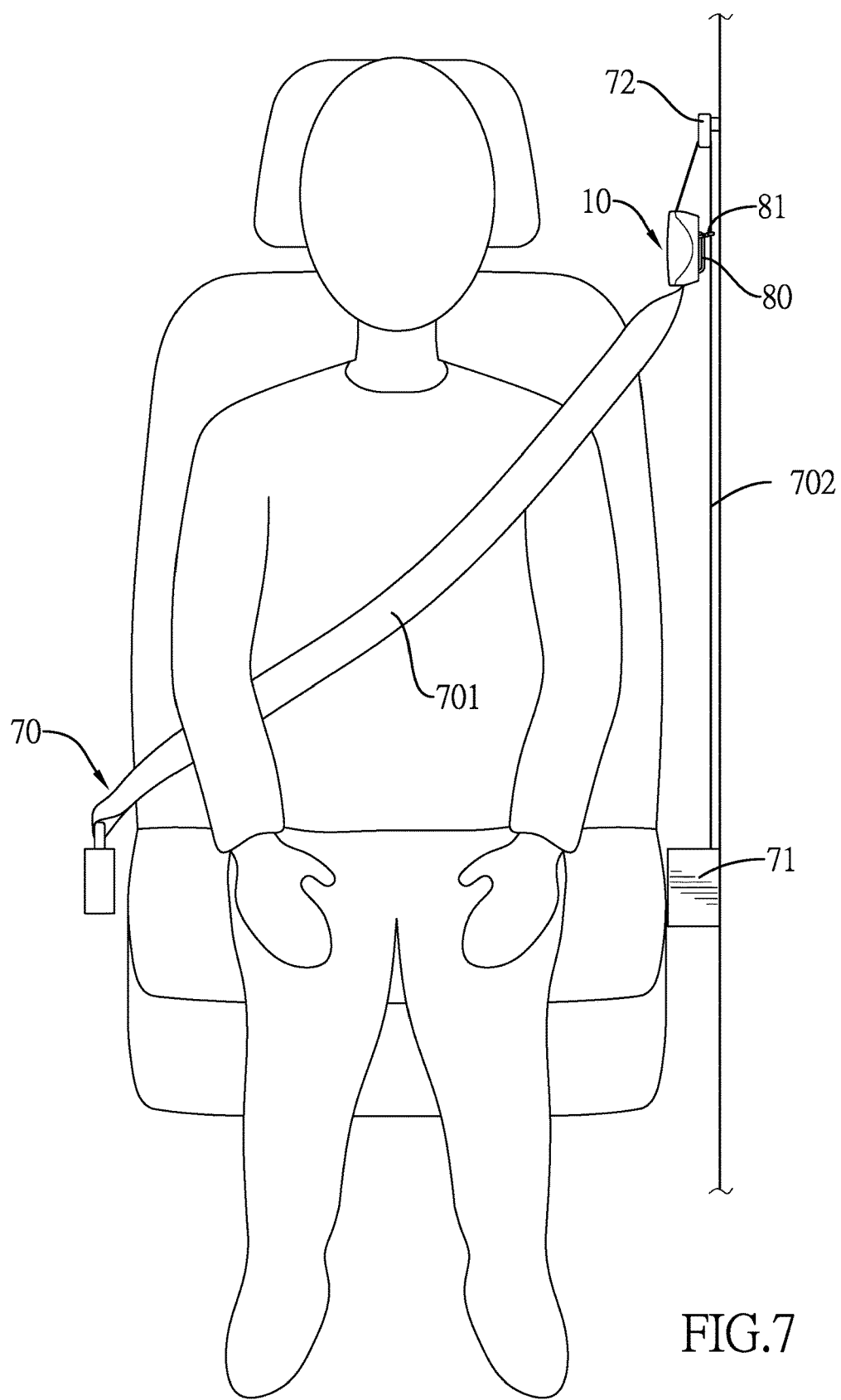
FIG. 7 is a schematic view of applying the adjustment device in FIG. 1 to the webbing of the seat belt mechanism fastened on a user.

With reference to FIGS. 1, 4, and 5, the manipulating unit 60 is slidably mounted around the connector 50. The manipulating unit 60 comprises a front slat 61, two side slats 62, a pushing portion 63, two limit portions 64, and two sliding rails 65. The front slat 61 is positioned in front of the frame 20 and the guide 30. The side slats 62 extend backwardly from a left side of the front slat 61 and a right side of the front slat 61 respectively. The side slats 62 are adjacent to the side walls 51 respectively. The pushing portion 63 protrudes backwardly on a back side of the front slat 61. The pushing portion 63 is disposed under the holding bar 40 and in front of the holding inclined surface 22. The limit portions 64 are disposed on the top sides of the two side slats 62 respectively. The limit portions 64 are disposed above the connector 50. The sliding rails 65 are longitudinally disposed on the side slats 62 respectively. The sliding rails 65 are disposed in the guiding grooves 55 respectively, so that the manipulating unit 60 may slide up and down relative to the connector 50.

With reference to FIGS. 1, 5 to 7, the adjustment device 10 further comprises an elastomer 80 and a connecting piece 81. The elastomer 80 is mounted through the through slot 54 and around the back wall 52. The connecting piece 81 is mounted on the elastomer 80.

With reference to FIGS. 1, and 6 to 8, in use, the adjustment device 10 is mounted on a seat belt mechanism. The seat belt mechanism comprises a webbing 70, a retractor 71, and a guiding ring 72. The webbing 70 is pulled out from the retractor 71 and passes through the guiding ring 72. The webbing 70 has a first segment 701 passing by the front side of the user from top to bottom obliquely, and a second segment 702 connected with the first segment 701 and positioned between the retractor 71 and the guiding ring 72. The connecting piece 81 mounted on the elastomer 80 is connected between the second segment 702 and the elastomer 80. The first segment 701 extends through the top of the manipulating unit 60, extends between the front slat 61 and the cross arm 53, extends between the holding bar 40 and the holding inclined surface 22, extends between the pushing portion 63 and the holding inclined surface 22, and extends outwardly from the bottom of the adjustment device 10.

Alternatively, the elastomer 80 and the connecting piece 81 may be omitted for mounting the adjustment device 10. In this way, the second segment 702 may pass through the through slot 54 directly.

Figure 8:
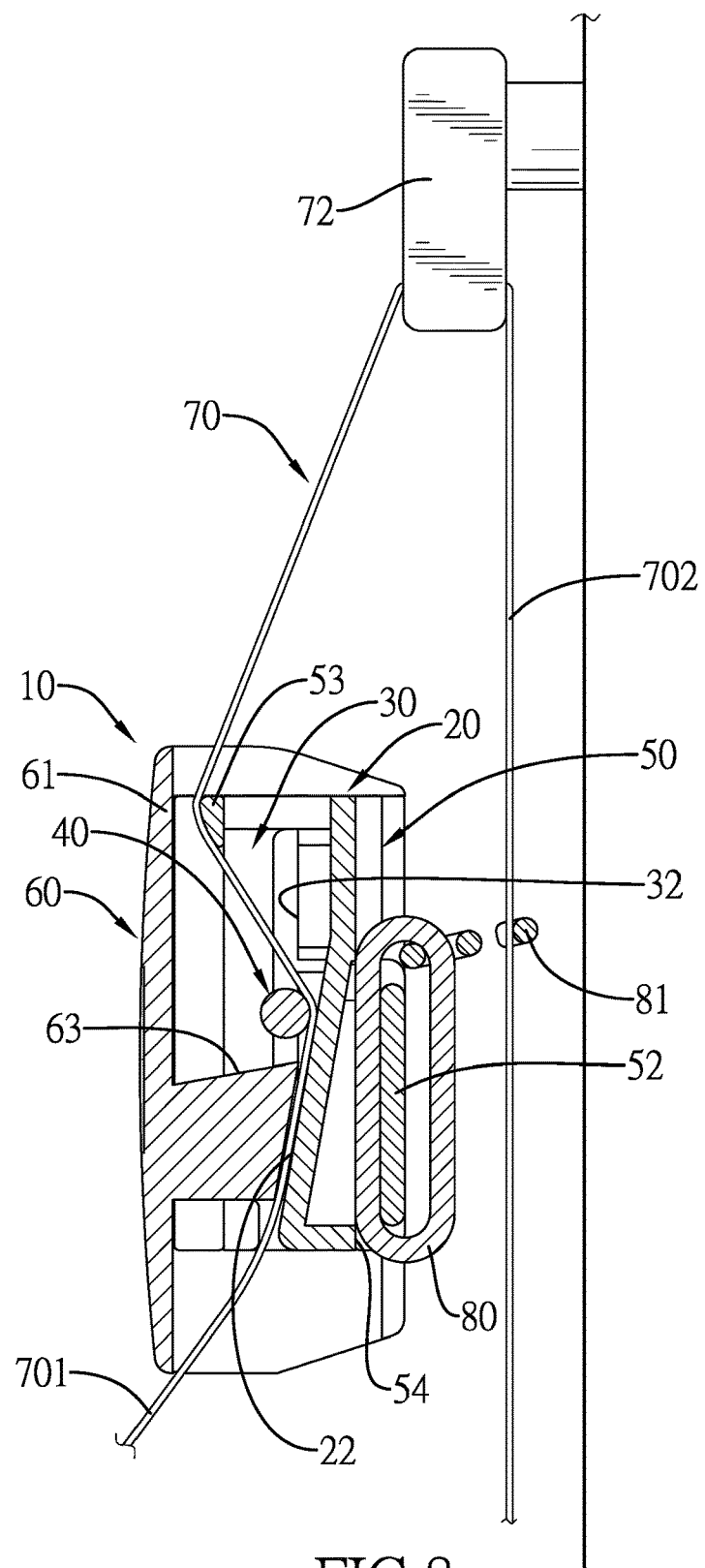
FIG. 8 is a schematic cross sectional side view of fixedly mounting the adjustment device of FIG. 1 on the webbing.

FIG. 8 shows that the adjustment device 10 is fixedly mounted on the webbing 70. Since the first segment 701 of the webbing 70 abuts against the cross arm 53 and is coiled around the holding bar 40, the holding bar 40 is pushed toward the holding inclined surface 22 by the tension of the webbing 70. As such, the first segment 701 is clamped between the holding bar 40 and the holding inclined surface 22. Further, when the webbing 70 and the frame 20 are moved relative to each other, the relative position between the webbing 70 and the frame 20 may be automatically locked by the frictions between the webbing 70 and the holding bar 40, between the webbing 70 and the holding inclined surface 22, and between the holding bar 40 and the guide 30.

Figure 9:
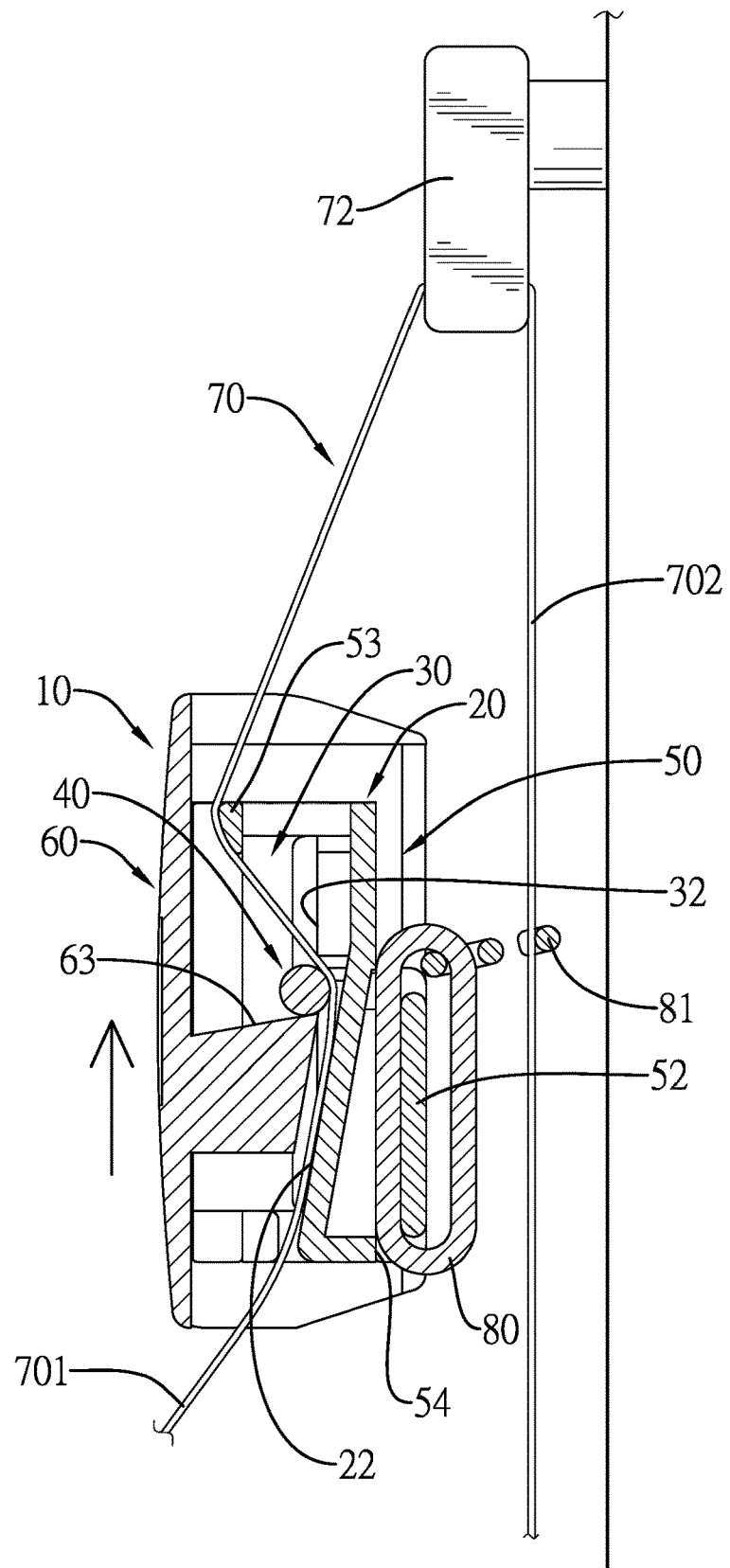
FIG. 9 is a cross sectional side view of pushing the manipulating unit of the adjustment device in FIG. 1 upwardly and releasing the first segment of the webbing from the held state.

With reference to FIG. 9, the manipulating unit 60 is moved upwardly relative to the frame 20, and the pushing portion 63 forces the holding bar 40 to move upwardly along the guiding slot 32 and away from the holding inclined surface 22, so as to unlock the first segment 701 from the adjustment device 10. In this way, the webbing 70 may be released from the holding inclined surface 22 and the holding bar 40, and the whole adjustment device 10 may move upwardly along the first segment 701. Accordingly, an increase in the height of the adjustment device 10 on the webbing 70 may be freely adjusted.

Figure 10:
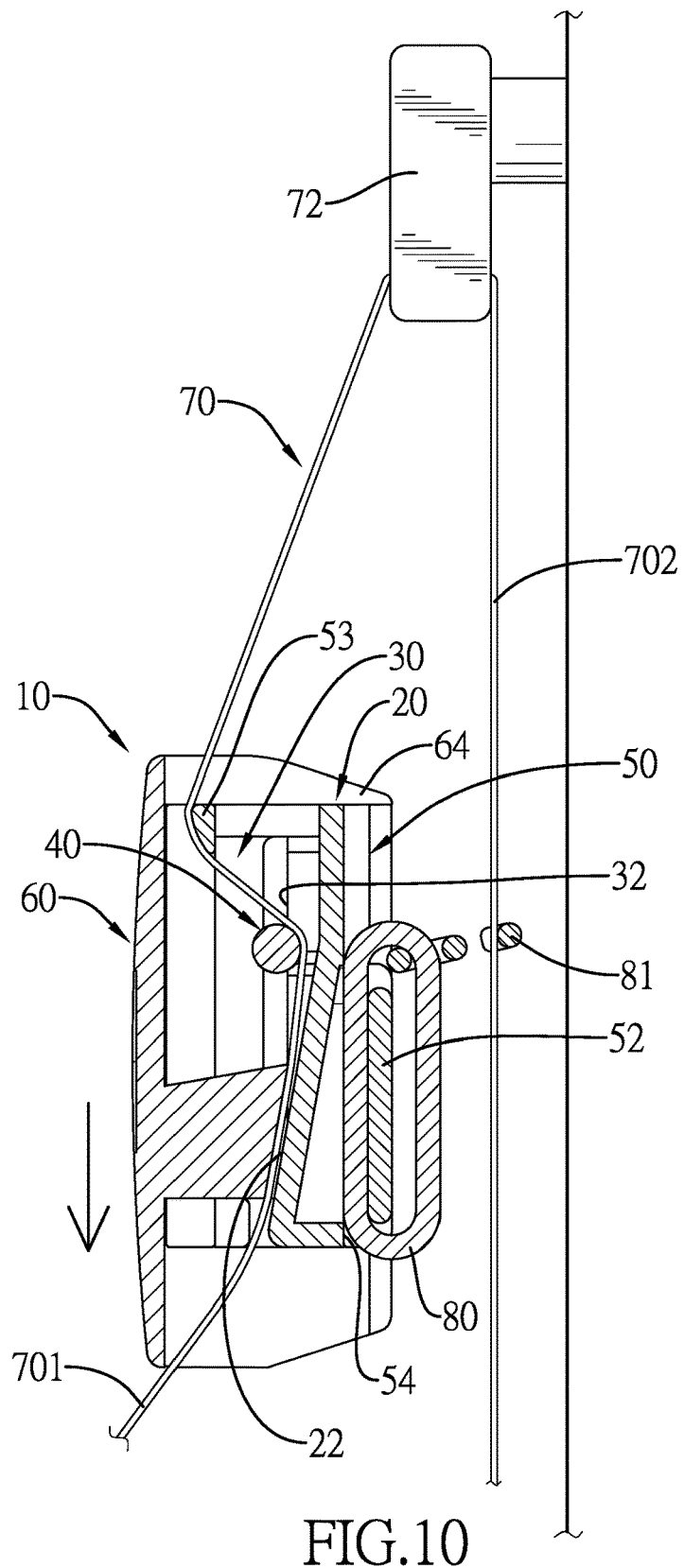
FIG. 10 is a cross sectional side view of pulling the manipulating unit of the adjustment device in FIG. 1 downwardly and releasing the first segment of the webbing from the held state.

With reference to FIG. 10, the manipulating unit 60 is moved downwardly relative to the frame 20. The limit portion 64 presses the connector 50 to force the frame 20 to move downwardly relative to the webbing 70. The holding bar 40 is moved away from the holding inclined surface 22 by the friction between the holding bar 40 and the first segment 701. As such, the first segment 701 is unlocked from the adjustment device 10. In this way, the whole adjustment device 10 may move downwardly along the first segment 701. Accordingly, a decrease in the height of the adjustment device 10 on the webbing 70 may be freely adjusted.

Once the height of the adjustment device 10 on the webbing 70 is adjusted to the desired position, the holding bar 40 may be pushed toward the holding inclined surface 22 by the tension of the webbing 70, and the adjustment device may automatically lock the webbing 70 again.

What is claimed is:

1. An adjustment device for a seat belt mechanism comprising:
    a frame comprising:
    a base;
    two straight edges respectively disposed at a left side of the base and a right side of the base; and
    a holding inclined surface formed on a front side of the base, disposed between the two straight edges, and inclined forwardly from top to bottom;
    a guide comprising:
    two guiding bars respectively fixed at a left side of the frame and a right side of the frame, and disposed in front of the two straight edges at an interval; and
    two guiding slots, each of the two guiding slots surrounded by a corresponding one of the two guiding bars and a corresponding one of the two straight edges, and extending longitudinally;
    a holding bar transversely disposed on the holding inclined surface, and comprising two opposite ends respectively extending into the two guiding slots to be movable along the two guiding slots;
    a connector mounted around the frame and comprising:
    two side walls arranged at an interval;
    a back wall connected between rear portions of the two side walls;
    a cross arm connected between tops of the two side walls and disposed above the holding bar;
    a through slot extending longitudinally, and surrounded by the back wall and a back side of the frame; and
    a manipulating unit slidably mounted around the connector, and comprising:
    a front slat positioned in front of the frame and the guide;
    two side slats respectively extending backwardly from a left side of the front slat and a right side of the front slat, and being respectively adjacent to the two side walls;
    a pushing portion formed on a back side of the front slat, and disposed under the holding bar and in front of the holding inclined surface; and
    two limit portions disposed on top sides of the two side slats respectively and above a top of the connector.

2. The adjustment device as claimed in claim 1, wherein:
    the frame comprises:
    two insertion slots respectively disposed at the left side of the base and the right side of the base, and being adjacent to a bottom side of the base; and
    two hooks respectively disposed at the left side of the base and the right side of the base, and being adjacent to a top side of the base; and
    each of the two guiding bars comprises:
    a top end;
    a bottom end;
    an upper protrusion extending backwardly from the top end, and abutting the top side of the base;

a lower protrusion extending backwardly from the bottom end, and inserted into a corresponding one of the two insertion slots; and an engaging notch disposed on the top end, and engaged with a corresponding one of the two hooks.

3. The adjustment device as claimed in claim 1, wherein the guide comprises a cross bar connected between the two guiding bars and integrated as one single part with the two guiding bars.

4. The adjustment device as claimed in claim 1, wherein the connector comprises two guiding grooves respectively disposed on the rear portions of the two side walls and extending longitudinally; and the manipulating unit comprises two sliding rails respectively longitudinally disposed on the two side slats and respectively disposed in the two guiding grooves.

5. The adjustment device as claimed in claim 1, wherein the frame comprises:

two resilient blocks respectively disposed at a top of the left side of the base and a top of the right side of the base; and two engaging protrusions respectively protruding outwardly from a bottom of the left side of the base and a bottom of the right side of the base and arranged under the two resilient blocks; and the connector comprises:

two top engaging recesses respectively disposed on the tops of the two side walls and respectively connected with the two resilient blocks; and two bottom engaging recesses respectively disposed on bottoms of the two side walls and respectively connected with the two engaging protrusions.

6. The adjustment device as claimed in claim 1, wherein the holding bar comprises two annular recesses respectively formed on the two opposite ends, and each of the two annular recesses is connected with the corresponding one of the two guiding bars and the corresponding one of the two straight edges.

7. The adjustment device as claimed in claim 6, wherein the connector comprises two guiding grooves respectively disposed on the rear portions of the two side walls and extending longitudinally; and the manipulating unit comprises two sliding rails respectively longitudinally disposed on the two side slats and respectively disposed in the two guiding grooves.

8. The adjustment device as claimed in claim 7, wherein the frame comprises:

two resilient blocks respectively disposed at a top of the left side of the base and a top of the right side of the base; and two engaging protrusions respectively protruding outwardly from a bottom of the left side of the base and a bottom of the right side of the base, and arranged under the two resilient blocks; and the connector comprises:

two top engaging recesses respectively disposed on the tops of the two side walls and respectively connected with the two resilient blocks; and two bottom engaging recesses respectively disposed on bottoms of the two side walls and respectively connected with the two engaging protrusions.

9. The adjustment device as claimed in claim 1, wherein the adjustment device comprises:

an elastomer mounted through the through slot and around the back wall; and a connecting piece mounted on the elastomer.

10. The adjustment device as claimed in claim 9, wherein the frame comprises:

two insertion slots respectively disposed at the left side of the base and the right side of the base, and being adjacent to a bottom side of the base; and two hooks respectively disposed at the left side of the base and the right side of the base, and being adjacent to a top side of the base; and each of the two guiding bars comprises:

a top end;

a bottom end;

an upper protrusion extending backwardly from the top end, and abutting the top side of the base;

a lower protrusion extending backwardly from the bottom end, and inserted into a corresponding one of the two insertion slots; and an engaging notch disposed on the top end, and engaged with a corresponding one of the two hooks.

11. The adjustment device as claimed in claim 10, wherein the connector comprises two guiding grooves respectively disposed on the rear portions of the two side walls and extending longitudinally; and the manipulating unit comprises two sliding rails respectively longitudinally disposed on the two side slats and respectively disposed in the two guiding grooves.

12. The adjustment device as claimed in claim 10, wherein the frame comprises:

two resilient blocks respectively disposed at a top of the left side of the base and a top of the right side of the base; and two engaging protrusions respectively protruding outwardly from a bottom of the left side of the base and a bottom of the right side of the base, and arranged under the two resilient blocks; and the connector comprises:

two top engaging recesses respectively disposed on the tops of the two side walls and respectively connected with the two resilient blocks; and two bottom engaging recesses respectively disposed on bottoms of the two side walls and respectively connected with the two engaging protrusions.

13. The adjustment device as claimed in claim 10, wherein the guide comprises a cross bar connected between the two guiding bars and integrated as one single part with the two guiding bars.

14. The adjustment device as claimed in claim 13, wherein the holding bar comprises two annular recesses respectively formed on the two opposite ends, and each of the two annular recesses is connected with the corresponding one of the two guiding bars and the corresponding one of the two straight edges.

15. The adjustment device as claimed in claim 14, wherein the connector comprises two guiding grooves respectively disposed on the rear portions of the two side walls and extending longitudinally; and the manipulating unit comprises two sliding rails respectively longitudinally disposed on the two side slats and respectively disposed in the two guiding grooves.

16. The adjustment device as claimed in claim 15, wherein the frame comprises:

two resilient blocks respectively disposed at a top of the left side of the base and a top of the right side of the base; and two engaging protrusions respectively protruding outwardly from a bottom of the left side of the base and a bottom of the right side of the base and arranged under the two resilient blocks; and the connector comprises:

two top engaging recesses respectively disposed on the tops of the two side walls and respectively connected with the two resilient blocks; and two bottom engaging recesses respectively disposed on bottoms of the two side walls and respectively connected with the two engaging protrusions.

17. The adjustment device as claimed in claim 10, wherein the holding bar comprises two annular recesses respectively formed on the two opposite ends, and each of the two annular recesses is connected with the corresponding one of the two guiding bars and the corresponding one of the two straight edges.

18. The adjustment device as claimed in claim 17, wherein the connector comprises two guiding grooves respectively disposed on the rear portions of the two side walls and extending longitudinally; and the manipulating unit comprises two sliding rails respectively longitudinally disposed on the two side slats and respectively disposed in the two guiding grooves.

19. The adjustment device as claimed in claim 18, wherein the frame comprises:

two resilient blocks respectively disposed at a top of the left side of the base and a top of the right side of the base; and two engaging protrusions respectively protruding outwardly from a bottom of the left side of the base and a bottom of the right side of the base, and arranged under the two resilient blocks; and the connector comprises:

two top engaging recesses respectively disposed on the tops of the two side walls and respectively connected with the two resilient blocks; and two bottom engaging recesses respectively disposed on bottoms of the two side walls and respectively connected with the two engaging protrusions.

* * * * *